Nov. 15, 1966        L. SLAYBAUGH ETAL        3,285,200
PROCESSING EQUIPMENT
Filed June 29, 1964
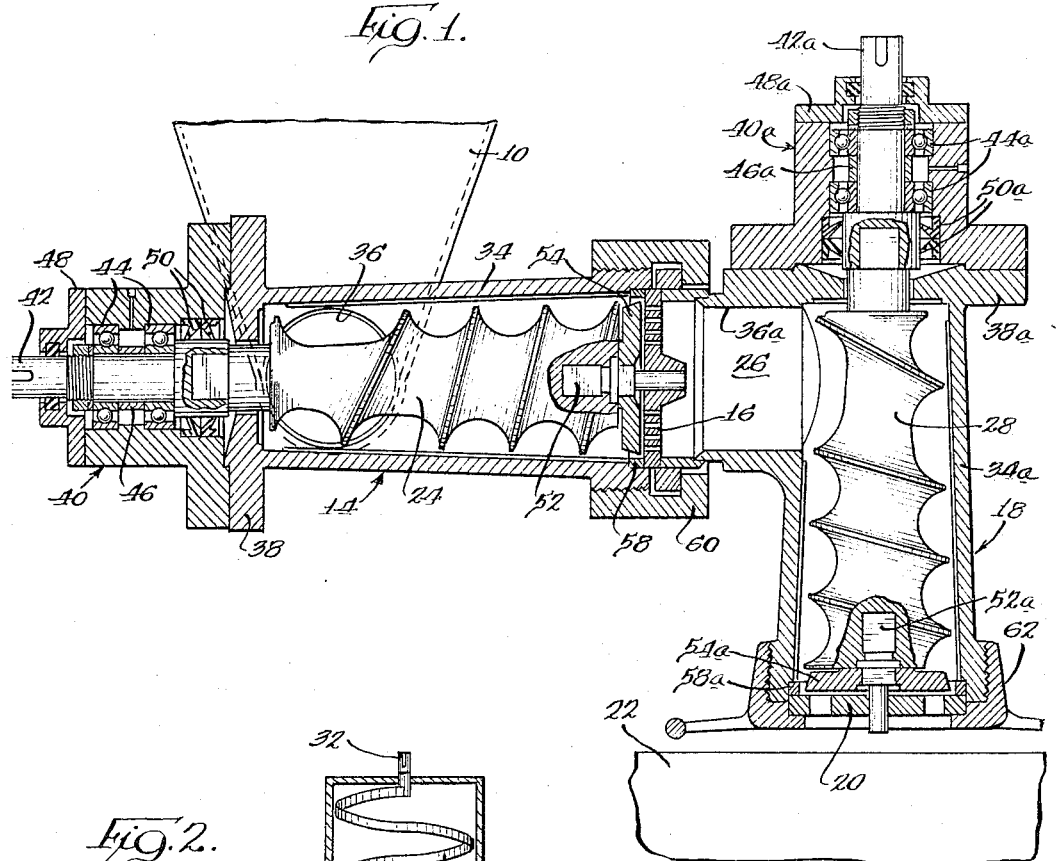
Inventors:
Lyle Slaybaugh
Paul A. Humiston, Jr.
By
Gary, Parker, Juettner & Cullinan
Attys 3,285,200
PROCESSING EQUIPMENT
Lyle Slaybaugh, Battle Creek, Mich., and Paul A. Humiston, Jr., Springs, Transvaal, Republic of South Africa, assignors to Kellogg Company, Battle Creek, Mich., a corporation of Delaware
Filed June 29, 1964, Ser. No. 378,743
3 Claims. (Cl. 107—14)

The present invention relates to improvements in processing equipment, and more particularly, to apparatus for automatically grinding, kneading and extruding products such as cereal base food products.

Exemplary of the field of application of the invention is the provision of apparatus for producing, in conjunction with other equipment, a snack product such as corn chips and similar cereal base products. Corn chips are a snack product consisting essentially of whole corn that has been ground into a meal, extruded as a chip, deep-fried in vegetable oil, and packaged. The basic raw material is a mixture of yellow and white whole corn which up to the present time has been processed essentially as follows:

(a) Whole corn is introduced into an open steam-jacketed kettle and cooked in boiling water for about ten minutes.

(b) The cooked corn is transferred to a tank where it is soaked for approximately eight hours in hot water to which calcium hydroxide has been added. The soaking loosens the hull or bran and allows the moisture to equalize throughout the kernels.

(c) The cooked and soaked corn is fed into a reel-type washer where large amounts of water remove the bran and calcium hydroxide.

(d) The washed corn is fed into a stone grinder and finely ground into a dough.

(e) The dough is manually kneaded and formed into a cylinder approximately six inches in diameter and about twenty inches long.

(f) The dough cylinders are manually fed into a hydraulic press extruder which forms the dough into chips measuring approximately one-sixteenth inch by five-eighths inch by two inches.

(g) The extruded chips are fed into a continuous frier and fried into a crisp palatable food.

(h) The fried product is salted, cooled to room temperature and packaged.

The object of the present invention is the provision of improved apparatus for automating processes such as above described, and particularly for automatically performing tedious time-consuming steps and steps of questionable sanitation, especially those involving hand manipulation of the food product.

Specifically, in the environment above described, it is the object of the present invention to provide apparatus for automatically and continuously grinding (step d), kneading and forming (step e), and feeding and extruding (step f) the corn and for automatically feeding the extruded chips (step g) into the frier.

By virtue of its automatic and continuous operation in the described environment, the apparatus of the invention affords the following significant advantages:

(1) Continuous operation, as opposed to intermittent operation, results in better control over the finished product.

(2) Better frying conditions are created because the product enters the frier at a continuous constant rate which allows better control over frying oil temperature and the amount of time the product remains in the oil, and thus more uniform consistency of the finished product.

(3) Improved product sanitation due to the fact that human hands do not come into contact with the food.

(4) Improved equipment sanitation because several process steps are carried out in a single machine, which means there is less equipment to keep clean, plus the fact that the design of the machine lends itself to more thorough cleaning than present equipment such as grinding stones which tend to absorb certain amounts of the food product.

Other objects and advantages of the invention will become apparent in the following detailed description.

Now, in order to acquaint those skilled in the art with the manner of making and using our improved processing equipment, we shall describe, in connection with the accompanying drawings, a preferred embodiment of the equipment and the preferred manners of making and using the same.

In the drawings:

FIGURE 1 is a vertical longitudinal section of the embodiment of the apparatus preferred for use in the above described environment; and FIGURE 2 is a fragmentary horizontal longitudinal section of said apparatus.

As illustrated, the preferred embodiment of the invention consists essentially of an upright supply hopper 10, a feedworm 12 in the bottom of the hopper, a laterally extending horizontally disposed extruder 14 communicating at its inlet end with the bottom of the hopper, a grinding and masticating die 16 at the outlet end of the extruder 14, a vertically disposed extruder 18 communicating at its inlet end with the outlet of the masticating die 16, and an extrusion die 20 at the outlet end of the extruder 18 disposed immediately above a continuous frier 22 for directly depositing formed chips into the frier.

In use in conjunction with the corn chip process above described, the supply hopper 10 receives the cooked, washed, whole corn and the feedworm 12 continuously feeds the corn into the inlet end of the horizontal extruder 14. The extruder 14 includes an extruding worm 24 which crushes the whole corn and simultaneously moves the corn toward the die 16. At this die, the corn is ground, thoroughly masticated and extruded into thin shreds. These shreds are then worked or kneaded into a dough in the space 26 between the two extruders, the working being caused by new shreds being forced into previously ground, masticated and extruded shreds. The dough thus formed enters into the vertical extruder 18. The latter includes an extruder worm 28 which further works or kneads the dough and simultaneously transports it downwardly to and through the extrusion die 20. The extrusion die in turn forms the dough into long strips, such for example as one-sixteenth inch thick and five-eighths inch wide. As the strips of dough leave the extrusion die, they automatically break into pieces approximately two inches long and the apparatus of this invention is so mounted that the extruded pieces of dough issuing from the vertical extruder fall directly into the frying oil of the continuous frier 22.

The hopper 10 is suitably of conventional structure, tapering downwardly and inwardly toward the feedworm 12 to facilitate feeding of the cooked and cleaned corn to the worm. The worm 12 is preferably a helical ribbon, including a drive shaft 32 protruding through the wall of the hopper and adapted to be driven by any conventional drive mechanism, such as an electric motor, an electric motor with gear reduction, or a belt and pulley drive (not shown). The drive means for the feed ribbon is preferably of a variable speed type so as to accommodate variations in the rate of feeding the corn to the horizontal extruder 14.

The extruder 14 includes a housing 34 generally conformed to the feedworm or auger 24, both preferably being of frusto-conical form and of increasing diameter from the inlet to the outlet end of the extruder. Adjacent the inlet end thereof, the housing 34 is provided with a laterally extending inlet 36 aligned with the feedworm 12, and into which the feedworm preferably extends, to facilitate feeding of the whole corn to the auger 24. At its inlet end, the extruder housing includes an apertured end wall through which a reduced neck portion of the worm 24 extends, the end wall being formed integrally with and comprising part of a radially extending flange 38 on the housing.

Removably secured to the flange 38, as by a plurality of circumferentially spaced bolts, is a drive shaft and bearing assembly 40. The assembly 40 includes a shaft 42 detachably connected at its inner end in driving relation with the reduced neck of the extruder worm or auger 24. The shaft 42 at its rearward end projects outwardly from the bearing assembly 40 and is adapted to be connected by pulleys and belts (not shown) in a conventional manner to a variable speed drive motor (not shown). The bearings of the assembly 40 suitably consist of a pair of axially spaced, radial thrust ball bearings 44 spaced from one another by an intermediate bearing spacer 46 and retained in place in the cylindrical housing of the assembly by means of an end cap 48 detachably connected to said housing, suitably by a plurality of circumferentially spaced bolts extended through the cap and threaded into the body. In addition, 50 encircle the head or inner end of the drive shaft 42 and are retained in place by the housing of the bearing assembly.

In the preferred structure, the drive shaft 42 has an enlarged head at its inner end provided with a non-circular bore adapted for slidable but non-rotatable reception of a complementary non-circular neck portion on the outer end of the auger 24. Thus, the auger is adapted to be rotated by the drive shaft, but may quickly be detached therefrom as will presently be described.

At its inner end, the worm or auger 24 is supported for rotation on a gudgeon 52 which includes a reduced cylindrical extension projecting beyond the auger and journalled in the die 16. The gudgeon also supports and drives a rotary knife 54 for the die, the knife being disposed in the space between the inner end of the auger 24 and the die 16.

As illustrated, the die 16 comprises a rigid disc having an annular array of relatively small diameter holes therethrough. This die, in conjunction with the auger 24 and knife 54, comprises means for expeditiously causing or assuring complete grinding of the corn, mastication of the same to facilitate subsequent automatic formation of a dough or mass of uniform consistency, and extrusion of the same in the form of thin shreds also to facilitate formation of the dough. At its center, the die 16 has an enlarged axial boss forming a bearing for the auger supporting gudgeon 52. Preferably, the die is mounted within a cylindrical counter bore in the open inner end of the extruder housing, and a die spacer 58 is mounted within the base portion of the counterbore properly to space the die 16 from the knife 54.

The vertical extruder 18 is preferably substantially identical to the horizontal extruder 14. In particular, the foregoing description of the extruder 14 is equally applicable to the extruder 18, and for sake of convenience, the components of the extruder 18 are thus indicated by the same reference numerals as previously employed with the suffix "a."

In distinction to the extruder 14, the inlet 36a of the extruder 18, which defines the dough forming space 26, is provided at its outer end with a coupling union 60 defined by a radial flange at the end of the inlet 36a and a rotatable collar journalled about this flange for threaded connection to the outlet end of the extruder housing 34. The flanged portion of the inlet 36a is preferably counterbored similar to the inner end of the housing 34 so that the die 16 is accurately positioned and fixedly retained between the housing 34 and the inlet 36a by virtue of the union 60.

At its outlet end, the housing 34a of the vertical extruder 18 is provided with a collar 62 detachably threaded onto the lower outlet end of the housing and serving to hold the extrusion die 20 in proper position relative to the auger 28 and the die knife 54a. As with the extrusion assembly 14, the die 20 comprises a bearing for the auger and knife supporting gudgeon 52a.

In use, the shafts 32, 42 and 42a are independently driven at individually variable speeds to cause the cooked and cleaned corn to be fed from the hopper 10 into the extruder 14; to be ground and forced by the worm or auger 24 to and through the masticating and shredding die 16; to be worked or kneaded within the inlet 36a of the extruder 18 by virtue of succeeding shreds being forced into preceding shreds to form a dough or mass; to be further worked and kneaded by the auger or worm 28 as it feeds the dough through the extruder 18 to the extrusion die 20; and finally to be extruded through the die 20 and dropped into the continuous frier 22 in individual chips or pieces. It is, of course, obvious that the specifically described extrusion die 20 may be replaced by others to facilitate formation of different size chips or pieces of varying shapes and sizes.

The apparatus thus performs, as a unitary, fully automatic and continuous operation, the previously required individual steps of grinding, kneading, forming, feeding and extruding the corn, and depositing the formed chips in the frier. Moreover, the apparatus removes the food from contact with human hands, especially in respect of the kneading, forming and feeding steps which heretofore were performed manually. By virtue of its automatic and continuous operation, the apparatus also greatly facilitates production of a finished product of greater uniformity since the feed of the chips to and the frying of them in the frier now becomes a uniformly continuous operation. Thus, the described apparatus attains all of the advantages previously attributed to it.

To clean the apparatus, the following procedure is recommended:

The flexible drive belt is removed from the pulley of the drive shaft 42a of the vertical extruder 18, and this extruder is then detached as a whole from the extruder 14 by disconnecting the two at the union 60. The extruder 18 may then be removed to a convenient location for cleaning. The grinding die 16, the knife 54 and the worm or auger 24 may then be removed from the housing 34 of the extruder 14 to facilitate cleaning of the detached elements. As will be appreciated by those reasonably skilled in the art, the reduced drive extensions of the augers 24 and 28 simply slide into and out of driving engagement with their respective drive shafts.

The housing 34 of the horizontal extruder may be retained integral with the hopper 10 for cleaning with the hopper, or if desired, the housing 34 could be detachably coupled to the hopper (as by means of a union similar to the union 60) to facilitate cleaning. The vertical extruder 18 is disassembled for cleaning simply by removing the threaded collar 62 and sliding the die 20, the knife 54a and the auger 28 out of the housing 34a of the extruder.

Reassembly of the components for use after cleaning is, of course, effected in reverse sequence.

Thus, in addition to its other advantages, the apparatus of the invention is readily maintained clean and sanitary. Accordingly, all of the objects and advantages of the invention have been shown herein to be attained in a convenient, economical and practical manner.

While we have shown and described what we regard to be the preferred embodiment of our invention, and have described one use to which the apparatus is effectively applied, it is to be appreciated that various rearrangements, modifications and changes may be made in the apparatus and that the same may be applied to a variety of other uses without departing from the scope of the invention, as defined by the appended claims.

We claim:

1. Processing equipment comprising a first generally horizontally disposed extruder housing having a radially open inlet adjacent one end and an axially open outlet at its other end, variable speed feed means for feeding material into said inlet, a second generally upright extruder housing having a radially open inlet adjacent its upper end and an axially open outlet at its lower end, means detachably coupling the inlet of said second housing to the outlet of said first housing, movable means in said first housing for grinding material received in the inlet of said first housing and for conveying it to the outlet of said first housing, movable means in said second housing for kneading material received in the inlet of the second housing and for conveying the material to the outlet of said second housing, a variable speed drive assembly on the inlet end of each of said housings, each including drive means detachably coupled to the movable means in the respective housing, a masticating die in the outlet of said first housing, said coupling means retaining the respective movable means and said masticating die in said first housing, an extrusion die in the outlet of said second housing, means on the outlet end of said second housing retaining the respective movable means and said extrusion die therein, said movable means, said dies and said housing being separable from one another upon detachment of said coupling means and the last-named means, and means for independently varying the speed of each said variable speed means.

2. Processing equipment comprising a first generally horizontally disposed extruder housing having a radially open inlet adjacent one end and an axially open outlet adjacent its other end, a second generally upright extruder housing having a radially open inlet adjacent its upper end and an axially open outlet adjacent its lower end, means detachably coupling the inlet of said second housing to the outlet of said first housing, a rotary auger extending axially through each of said housing, a drive assembly on the inlet end of each of said housings each including a drive shaft coaxial with the respective housing and detachably coupled to the respective auger, a die in the outlet of each of said housings, said coupling means retaining the respective die in the outlet of said first housing, means on the lower end of said second housing detachably retaining the respective die therein, said dies each including axially extending bearing means, and means on each of said augers slidably and detachably journalled on the respective bearing means, said dies, augers and housings being separable from one another upon detachment of said coupling means and said retaining means.

3. Processing equipment comprising a pair of extruder housings each having a radially open inlet adjacent one end and an axially open outlet adjacent its other end, one housing being disposed upright with its outlet lowermost and the other housing extending laterally from adjacent the upper end of the one housing, means detachably connecting the inlet of the one housing to the outlet of the other housing, a rotary auger extending axially through each of said housings, a drive assembly on the inlet end of each of said housings each including a drive shaft coaxial with the respective housing and having freely slidable but rotatably interlocked connection with the respective auger, a die in the outlet of each of said housings, said coupling means retaining the respective die in the outlet of said first housing, retaining means on the outlet end of said second housing detachably retaining the respective die therein, a knife slidably but non-rotatably mounted on each of said augers adjacent the respective die, said dies, augers, knives and housings being separable from one another upon detachment of said coupling means and said retaining means.

References Cited by the Examiner

UNITED STATES PATENTS 2,633,091    3/1953    Wenger et al. _____ 107—14
3,035,622    5/1962    Biro _____ 146—182

FOREIGN PATENTS 568,094    3/1945    Great Britain.
354,208    11/1935    Italy.

WALTER A. SCHEEL, *Primary Examiner.*

BILLY J. WILHITE, *Examiner.*